Patented Oct. 10, 1939

2,175,213

UNITED STATES PATENT OFFICE 2,175,213

COMPOSITION FOR PREVENTING SUNBURN

Charles L. Parsons, Washington, D. C., assignor of one-half to Henry C. Parker, Washington, D. C.

No Drawing. Application June 15, 1937, Serial No. 148,415

5 Claims. (Cl. 167—90)

This invention relates to composition for preventing sunburn; and it includes a cosmetic composition for preventing sunburn comprising a flesh-colored flaked, light-metal powder, said powder being advantageously dyed or pigmented to produce a flesh or suntan tint and mixed in to paste or powder form with a vehicle tending to promote ease of application and adherence to the skin; all as more fully hereinafter set forth and as claimed.

The prevention of sunburn has become of increasing importance since the discovery that sun baths are of therapeutic value and since the more recent popularity of the so-called sun-tan complexion. It has become rather common for office workers to attempt to acquire a healthy-looking tan within vacation periods of two weeks or less. And these attempts too frequently lead only to painful sunburn. Severe cases of sunburn are not only painful but are highly dangerous since infection is likely to occur unless proper precautions are taken. Other people, when they are going on a fishing trip, for example, do not wish to become either tanned or sunburned. And in such cases there has been no product available on the market giving satisfactory protection to the skin. Most of the prior art preparations which are advertised for this purpose merely tend to prevent blistering of the skin or to relieve any sunburn which is acquired. Other preparations have been suggested containing substances tending to act selectively in filtering out the ultra violet light from sunlight. But these preparations are subject to two objections, first, it is necessary, in order to obtain satisfactory protection, to apply these preparations in thick layers which are uncomfortable and objectionable to the user and second, these preparations usually permit passage of the infra red heating rays while screening out the rays which have the greatest therapeutic value. Apparently no one has suggested heretofore any preparation capable of diminishing the total intensity of the exposure without altering the quality of the light to which the skin is exposed.

I have found that colored flaked metal powders when applied to the skin, even in quantities which produce merely a slight bronzy appearance, afford complete protection from sunburn. When applied in somewhat smaller quantities these powders permit the passage of ultra violet light in sufficient amount to produce a desired therapeutic effect while still substantially preventing sunburn. It is thus possible to produce an accurately controlled exposure of the skin to sunlight without any danger of acquiring a severe burn and without alteration of the quality of the sunlight to which the skin is exposed.

The principal danger of sunburn is that its full effect is not noticed until several hours after it has been acquired. By use of the present invention it is possible to vary the degree of exposure safely from day to day until the desired effect is obtained. This can be accomplished without staying indoors or avoiding exposure to sunlight during the testing period. For example on the first day's exposure it is important to apply the new preparation in quantity sufficient to insure the absence of sunburn. On the second day the quantity applied can be diminished by about one-third, for example, in which case a slight but unobjectionable burn is generally acquired. On succeeding days it is possible to gradually diminish the protection, as the skin becomes tanned, until the preventive preparation can be discarded entirely. With this preparation it is now possible, for the first time, for a person who is subject to sunburn to expose himself to the sunshine on a full day's fishing trip, for example, and to return without a trace of sunburn. Even a slight reddening of the skin can be avoided. For persons who do not wish to become tanned or burned the use of this new preparation permits a great extension of their out-door activities.

Another important advantage of the present invention is that the heating effect of the sunlight can be diminished appreciably by the use of this preparation. This effect is believed to be due to the direct reflection of the light by the flaked metal. A person can actually withstand the heat better when using the new preparation. My preparation, moreover, does not appreciably effect the "breathing" of the skin or the evaporation of moisture from the skin in contrast to other sunburn preventives.

It might be considered possible to employ any opaque material to the skin in order to obtain protection from sunburn. But this is not strictly true. A heavy application of the ordinary face powder to the skin, for example, affords little if any protection from sunlight. In order to obtain protection from ordinary opaque powders it would be necessary to employ layers of appreciable thickness. Such layers can not be made to adhere readily to the skin and would be, of course, highly uncomfortable as well as objectionable to the user. In contrast to the use of such materials it is possible to obtain complete protection from a film of flaked metal which is even too thin to be continuous. Such a film adheres to the skin readily and is not even perceptible to the touch. It is quite unobjectionable to the user.

The cause for the important differences between the use of flaked metal powders and powders of other opaque materials apparently resides in the fact that the flaked metals form a film in which the flattened particles lie flush with the surface of the skin and these metal particles act as tiny mirrors reflecting the sunlight directly away from the skin. On the other hand powders of other opaque materials doubtless merely scatter the sunlight rather than reflecting it. While this theory appears to explain the important differences which exist between my flaked metal powders and powders of other opaque materials, I do not wish to be bound by any theory of the action of my powders. The facts remain as stated.

The metallic color of flaked metal powders is, of course, objectionable to some users. This objection is overcome in the present invention by coloring the metal powders in such fashion that they are either substantially imperceptible or tend to enhance the appearance. It is possible to substantially duplicate the color of the skin by suitable dyeing of the metal powders, for example, it is possible to produce colors which closely resemble the so-called suntan complexion which is so greatly desired. In order to enhance the personal appearance it is advantageous to employ at least two preparations having somewhat different tints. For example a flesh colored or a suntan powder can be employed with a powder which has a redder tint, the latter being used as rouge.

All light weight metals which are capable of being made into flaked powders are useful in the present invention. It is advantageous, of course, to select metal powders which are capable of being dyed, such as aluminum, magnesium and zinc. These powders can be dyed in general with any of the lake-forming dyes. A large number of these dyes are available. For example the so-called aniline dyes and azo dyes are capable of dyeing light metal powders. Conventional methods can be used for dyeing these powders.

Of course the number of available dyes which are capable of producing the desired flesh color or suntain color are somewhat limited. However, there are numerous lake-forming dyes capable of producing reds and tan shades. It is not difficult to produce flesh colors by suitable mixing of such dyes. Dull tones can be produced by heavily oxidizing the metal powder followed by a rather light dyeing. The oxide coatings formed by oxidizing treatments produce a white background which is desirable and, if the powder is not too heavily dyed, this whitish background blends with the color of the dye. To produce red tints, the following dyes are available: rhodamine S, S extra, eosine YS, magenta, amaranth and Ponceau 3R, for example. Brown or tan shades may be produced by the use of Bismark brown, direct brown and chrysoidine No. 60, for example. These dyes are advantageously used in admixture.

It is possible, of course, to mix pigments, such as rouge, with the dyed metal powders to produce various tints. It is also possible to mix metal powders which have been dyed in different colors. Pigmenting methods of coloring the metal powders can be employed. For example, an oxidized aluminum bronze powder can be colored brown by impregnating it with a potassium permanganate solution followed by heating to decompose the permanganate. The resulting brown metal powder can then be dyed if desired. Or various pigments or mixtures thereof can be precipitated within the porous oxide layer of an oxidized metal powder by suitable metathetic reactions. Alternate treatments in solutions of silver nitrate and potassium chromate will precipitate the crimson silver chromate within the pores of the oxide coating, for example.

Flaked metal powders are commonly produced by the so-called stamping method during which they acquire a greasy film. This film should be removed prior to any dyeing operation. After cleaning the metal powder, it is advantageous to oxidize or to mordant the surface of the flakes prior to dyeing. A solution of tannic acid in alcohol can be employed for both cleaning and mordanting, if desired. Or the flaked metal can be boiled with a dilute solution of alum or merely treated with an aqueous solution of tartar emetic, in order to produce the desired mordanting. A treatment with an alkali metal chromate or dichromate, either before or after dyeing, enhances the color of the product and gives a slight yellow-brown tint which may be desired.

In the dyeing operation it is conventional to employ alcoholic solutions of the appropriate dye or dye mixture. Such a solution may be mixed with the metal powder and evaporated to dryness with continuous agitation in order to produce uniform coloring without causing sticking together of the flakes. It is also possible to add water to the mixture of the metal powder and the alcoholic dye solution which usually tends to precipitate the dye on the powder, thus avoiding the evaporation step. The metal powders dyed in this manner have a dull or matte appearance. For use in the arts such powders are commonly polished with the aid of lard or other lubricant. For the present use, however, it is desirable to leave the matte appearance since this makes the powder less apparent on the skin.

In the following specific examples directions are given for making illustrative sunburn preventive preparations which fall within the purview of the present invention and with which favorable results have been obtained.

A suntan colored preparation can be made by heating a small quantity of aluminum bronze powder with a 5 per cent solution of oxalic acid until bubbling ceases. The resulting, slightly oxidized powder can then be dried and added to an aqueous solution of potassium permanganate, the mixture being evaporated to dryness under conditions of agitation, the dry powder being then heated further until a brown color develops. This brown powder can then be mixed with zinc stearate and a small amount of rouge in proportions to produce substantially a suntan color. When this preparation is rubbed on the skin in quantity sufficient to give a pronounced coloring, it affords complete protection from sunburn. The zinc stearate makes the preparation somewhat water-resistant.

A dyed flesh colored powder can be prepared by cleaning aluminum bronze powder by boiling it with a 10 per cent solution of tannic acid in alcohol. The powder is then dyed by treating it with an alcoholic solution of rhodamine S, S extra and a small amount of Bismarck brown, the solution being evaporated to dryness under conditions of agitation. The resulting product can be mixed in approximately equal proportions with a conventional vanishing cream. A salve-like composition results which is substantially flesh colored and which provides protection from sunburn.

A vanishing cream suitable as a vehicle for a dyed bronze powder can be made by melting together 1000 grams of stearic acid and 250 grams of lard, then adding 100 cc. of aqueous ammonia (specific gravity 0.88) while heating and finally adding gradually 7000 cc. of distilled water while cooling and agitating to produce the desired emulsion.

While I have given several illustrations of what I consider to be advantageous embodiments of the present invention, it will be readily apparent to those skilled in this art that many variations can be made in the preventive compositions and in the procedures for making the same without departing from the purview of the present invention. It is evident, for example that the vehicle or extender used in admixture with the bronze powder is of secondary importance. It is within the skill of the art to use vehicles which will make the compositions water-proof and to provide compositions having the consistency of creams or powders. In the making of preparations in powder form, for example, talc, rice powder or other cosmetic powders can be added as vehicles to the bronze powder. Insoluble metal soaps, such as zinc, calcium and titanium stearates make the compositions somewhat water-resistant. Various additions can be made to increase the sticking properties of the bronze powders. In making compositions of cream-like consistency various emollients, such as petrolatum, cocoa butter, lanoline, beeswax and other oleaginous materials may be employed. It is possible by the choice of suitable dyes to produce a series of colors ranging from tan to rouge color with or without a white or cream colored base. Various gum binders can be employed in my compositions and aqueous emulsions of these in which the metal powder is held in suspension can be made. Ordinary library paste can be employed as a water-soluble vehicle. Compositions which are substantially water-proof can be made by the use of a water-insoluble adhesive, such as marine glue, for example. The bronze powder can be mixed with a rubber cement to produce a composition which is substantially water-proof and which can be removed by a light rubbing action. And it is obvious, of course, that these preparations can be scented and that various preservatives may be added. These and other modifications which fall within the scope of the following claims I consider within my invention.

What I claim is:

1. A cosmetic composition for preventing or reducing sunburn which comprises a vehicle having a substantially flesh-colored, flaked, light-weight metal powder dispersed therein.

2. The cosmetic of claim 1 wherein said metal powder is a dyed aluminum powder.

3. The cosmetic of claim 1 wherein said metal powder is an aluminum powder bearing an artificial oxide coating, said coating being pigmented.

4. The cosmetic of claim 1 wherein the said vehicle includes a material having the property of making said composition water resistant.

5. A flesh colored cosmetic preparation for preventing or reducing sunburn which comprises a vehicle having a light colored, flaked aluminum powder and a pigment dispersed therein, adapted to produce the flesh color.

CHARLES L. PARSONS.